(12) United States Patent
Tarukawa et al.

(10) Patent No.: US 11,578,757 B2
(45) Date of Patent: Feb. 14, 2023

(54) SEALING APPARATUS AND SEALING STRUCTURE

(71) Applicant: NOK CORPORATION, Tokyo (JP)

(72) Inventors: Yuichi Tarukawa, Fukushima (JP); Yuichi Shuto, Fukushima (JP); Kei Sasaki, Fukushima (JP); Shohei Yamane, Fukushima (JP); Takuya Kato, Fukushima (JP)

(73) Assignee: MINEBEA MITSUMI Inc., Nagano (JP)

( * ) Notice: Subject to any disclaimer, the term of this patent is extended or adjusted under 35 U.S.C. 154(b) by 114 days.

(21) Appl. No.: 16/417,881

(22) Filed: May 21, 2019

(65) Prior Publication Data
US 2019/0271359 A1 Sep. 5, 2019

Related U.S. Application Data

(63) Continuation of application No. PCT/JP2017/041043, filed on Nov. 15, 2017.

(30) Foreign Application Priority Data

Nov. 25, 2016 (JP) .............................. JP2016-229349

(51) Int. Cl.
*F16C 33/78* (2006.01)
*F16C 33/66* (2006.01)
(Continued)

(52) U.S. Cl.
CPC .............. *F16C 33/78* (2013.01); *F16C 33/66* (2013.01); *F16J 15/324* (2013.01); *F16J 15/3232* (2013.01)

(58) Field of Classification Search
CPC .. F16C 33/66; F16C 33/6618; F16C 33/6655; F16C 33/762; F16C 33/763; F16C 33/78;
(Continued)

(56) References Cited

U.S. PATENT DOCUMENTS

| 4,502,739 A | * | 3/1985 | Flander | ............... F16C 33/6618 |
| | | | | 384/481 |
| 6,953,193 B2 | * | 10/2005 | Kanzaki | ................ F16C 19/186 |
| | | | | 277/549 |

(Continued)

FOREIGN PATENT DOCUMENTS

| JP | 2004-353710 A | 12/2004 |
| JP | 2006-083878 A | 3/2006 |

(Continued)

OTHER PUBLICATIONS

Extended European Search Report for corresponding European Application No. 17873728.4, dated Jun. 17, 2020.
(Continued)

*Primary Examiner* — Nicholas L Foster
(74) *Attorney, Agent, or Firm* — Pearne & Gordon LLP

(57) ABSTRACT

A sealing apparatus includes: an annular reinforcement ring around an axis; and an annular elastic body part around the axis, which is attached to the reinforcement ring and is formed of an elastic body. The elastic body part has: a side lip, an intermediate lip, and a grease lip. A grease as a lubricant is applied to respective inner peripheral side surfaces of the side lip, the intermediate lip, and the grease lip. A thickener of the grease includes no urea-based thickener. In a usage state of the sealing apparatus, a cross sectional area of an inter-lip space enclosed by the side lip, the intermediate lip, and a hub ring is equal to or greater than 3.5 mm$^2$.

5 Claims, 11 Drawing Sheets

(51) Int. Cl.
*F16J 15/3232* (2016.01)
*F16J 15/324* (2016.01)

(58) Field of Classification Search
CPC .............. F16C 33/7816; F16C 33/7823; F16C 33/7853; F16C 33/7876; F16C 2240/54; F16J 15/3232; F16J 15/324
See application file for complete search history.

(56) References Cited

U.S. PATENT DOCUMENTS

| | | | | |
|---|---|---|---|---|
| 8,231,129 | B2* | 7/2012 | Kobayashi | F16C 33/7876 277/346 |
| 9,623,703 | B2* | 4/2017 | Shibata | F16C 33/7879 |
| 10,794,428 | B2* | 10/2020 | Shuto | F16C 33/74 |
| 2005/0023766 | A1* | 2/2005 | Kanzaki | F16C 33/7876 277/549 |
| 2009/0256316 | A1* | 10/2009 | Kanzaki | F16C 33/7876 277/562 |
| 2010/0066029 | A1* | 3/2010 | Kobayashi | F16J 15/3232 277/361 |
| 2014/0225332 | A1* | 8/2014 | Baart | F16J 15/324 277/549 |
| 2014/0346850 | A1* | 11/2014 | Shibata | F16C 33/7826 301/109 |
| 2018/0156277 | A1* | 6/2018 | Yamane | F16C 33/78 |
| 2019/0024800 | A1* | 1/2019 | Baart | F16C 33/7876 |
| 2019/0277340 | A1* | 9/2019 | Shuto | F16C 33/78 |
| 2020/0292079 | A1* | 9/2020 | Ito | F16J 15/3232 |

FOREIGN PATENT DOCUMENTS

| | | | |
|---|---|---|---|
| JP | 2006132707 | * | 5/2006 |
| JP | 2010-185491 | A | 8/2010 |
| JP | 2010-230058 | A | 10/2010 |
| JP | 2011-069422 | A | 4/2011 |
| JP | 2013-124764 | A | 6/2013 |
| JP | 2015-206434 | A | 11/2015 |
| JP | 3201207 | U | 11/2015 |
| JP | 2017-026118 | A | 2/2017 |
| JP | 2018-59586 | A | 4/2018 |

OTHER PUBLICATIONS

International Preliminary Report on Patentability for corresponding International Application No. PCT/JP2017/041043 dated May 28, 2019.
English translation of the Written Opinion for corresponding International Application No. PCT/JP2017/041043 dated Feb. 13, 2018.
International Search Report for corresponding International Application No. PCT/JP2017/041043 dated Feb. 13, 2018.
Written Opinion for corresponding International Application No. PCT/JP2017/041043 dated Feb. 13, 2018.
Chinese Office Action dated Feb. 3, 2020 for corresponding Chinese Application No. 201780073239.3 and English translation.
Korean Notification of Refusal dated May 18, 2020 for corresponding Korean Application No. 10-2019-7015732 and English translation.
Notice of Final Rejected dated Oct. 27, 2020 for corresponding Korean Application No. 10-2019-7015732 and English translation.
Office Action dated Apr. 21, 2021 for corresponding European Application No. 17873728.4.
Notice of Reasons for Refusal dated Nov. 29, 2021 for corresponding Japanese Application No. 2018-552521 and English translation.
Notice of Reasons for Refusal dated Jun. 13, 2022 for corresponding Japanese Application No. 2018-552521 and English translation.

* cited by examiner

|  | EXAMPLE 1 | | EXAMPLE 2 | | EXAMPLE 3 | | EXAMPLE 4 | |
|---|---|---|---|---|---|---|---|---|
|  | APPLICATION VOLUME (g) | VOLUME RATIO OF SPATIAL VOLUME AND GREASE VOLUME (%) | APPLICATION VOLUME (g) | VOLUME RATIO OF SPATIAL VOLUME AND GREASE VOLUME (%) | APPLICATION VOLUME (g) | VOLUME RATIO OF SPATIAL VOLUME AND GREASE VOLUME (%) | APPLICATION VOLUME (g) | VOLUME RATIO OF SPATIAL VOLUME AND GREASE VOLUME (%) |
| SIDE LIP | 0.02 | 2 | 0.15 | 16 | 0.2 | 21 | 0.2 | 21 |
| INTERMEDIATE AND GREASE LIPS | 0.03 | 6 | 0.13 | 25 | 0.13 | 25 | 0.17 | 33 |
| TOTAL | 0.05 | - | 0.28 | - | 0.33 | - | 0.37 | - |
| PRESENCE OR ABSENCE OF INCREASE AND FLUCTUATION OF TORQUE | ABSENCE | | ABSENCE | | ABSENCE | | ABSENCE | |

FIG.8

|  | COMPARATIVE EXAMPLE 1 | | COMPARATIVE EXAMPLE 2 | |
|---|---|---|---|---|
|  | APPLICATION VOLUME (g) | VOLUME RATIO OF SPATIAL VOLUME AND GREASE VOLUME (%) | APPLICATION VOLUME (g) | VOLUME RATIO OF SPATIAL VOLUME AND GREASE VOLUME (%) |
| SIDE LIP | 0.22 | 23 | 0.4 | 42 |
| INTERMEDIATE AND GREASE LIPS | 0.19 | 37 | 0.32 | 63 |
| TOTAL | 0.41 | - | 0.72 | - |
| PRESENCE OR ABSENCE OF INCREASE AND FLUCTUATION OF TORQUE | PRESENCE | | PRESENCE | |

FIG.9

SEALING APPARATUS AND SEALING STRUCTURE

CROSS REFERENCE TO RELATED APPLICATIONS

The present application is a continuation application of International Application No. PCT/JP2017/041043, filed on Nov. 15, 2017, which claims priority to Japanese Patent Application No. 2016-229349, filed on Nov. 25, 2016. The contents of these applications are incorporated herein by reference in their entirety.

BACKGROUND

Technical Field

The present disclosure relates to a sealing apparatus and a sealing structure and particularly relates to a sealing apparatus and a sealing structure, each of which seals a space between an annular outer periphery side member and an annular inner periphery side member, the annular outer periphery side member and the annular inner periphery side member being mutually relatively rotatable about an axis.

Background Art

A hub bearing which rotatably supports a wheel in a vehicle, for example, an automobile is present in an environment where the hub bearing is directly exposed to foreign substances such as rain water, muddy water, and dust. Therefore, conventionally, a sealing apparatus for sealing an internal space formed between an outer ring and a hub which are mutually relatively rotatable with respect to an axis is attached to the hub bearing. This sealing apparatus serves to seal a lubricant in an inside of the hub bearing and at the same time, serves to prevent foreign substances from entering the inside thereof. In addition, due to the demand for lower fuel consumption and the like, reduction in a sliding resistance (torque resistance) applied to the hub bearing has been demanded of this sealing apparatus.

FIG. 11 is a partial cross-sectional view showing a schematic configuration of a sealing apparatus (hereinafter, also referred to as a hub seal) which is attached to the conventional hub bearing. As shown in FIG. 11, for a hub bearing 200, in order to seal an annular space 203 between an outer ring 201 and a hub 202 which mutually coaxially relatively rotate, a sealing apparatus 100 as the conventional hub seal is fitted between the outer ring 201 and the hub 202. The sealing apparatus 100 serves to prevent a lubricant for a bearing ball 204, which is present inside the space 203, from leaking and at the same time, serves to prevent foreign substances from entering the inside of the space 203.

As shown in FIG. 11, the sealing apparatus 100 includes a reinforcement ring 111 which is formed of metal and is fitted to an inner peripheral surface of the outer ring 201 of the hub bearing 200 and an elastic body part 112 which is formed of a rubber material and is formed integrally with the reinforcement ring 111 so as to cover the reinforcement ring 111. In the sealing apparatus 100, the elastic body part 112 has a side lip 113, an intermediate lip 114 which is located on an inner peripheral side of the side lip 113, and a grease lip 115 which extends inward on an inner side of the intermediate lip 114. The lips 113, 114, and 115 slidingly contact an outer peripheral surface 202a of the hub 202. The side lip 113 and the intermediate lip 114 mainly serve to prevent foreign substances from entering the inside of the space 203 of the hub bearing 200 and the grease lip 115 mainly serves to prevent the lubricant for the bearing ball 204, which is present inside the space 203, from leaking.

DOCUMENT LIST

Patent Literature

Patent Literature 1: Japanese Registered Utility Model No. 3201207

SUMMARY

The outer peripheral surface 202a of the hub 202 is formed through processing. Therefore, finishing marks caused by the processing may remain on the outer peripheral surface 202a. In some hub bearing, these finishing marks which have constant directional properties, that is, the finishing marks (lead seams) which are constituted of a plurality of groove-like marks such as spiral-shaped marks and linear marks, formed so as to extend along an axis, may be formed on the outer peripheral surface 202a. When the lead seams are formed on the outer peripheral surface 202a of the hub 202, the side lip 113 and/or the intermediate lip 114 may contact the outer peripheral surface 202a in a larger width which exceeds a predetermined contact width (interference) and may be brought in the so-called entire abutting state. In this case, a sliding resistance which is applied by the side lip 113 and/or the intermediate lip 114 to the hub 202 upon rotating the hub 202 becomes large, thereby making a driving torque of the hub 202 large.

As described above, when the conventional sealing apparatus 100 is used in the hub bearing 200 which includes the hub 202 having the lead seams, a contact width of the side lip 113 and/or the intermediate lip 114 with the hub 202 may become large upon rotating the hub 202, and a sliding resistance (friction torque) against the hub 202 may become large, thereby making a driving torque of the hub 202 large. Therefore, a configuration allowing the driving torque of the hub to be stabilized without increasing the driving torque thereof even when the conventional sealing apparatus is used for the hub bearing which includes the hub having the lead seams has been demanded.

In view of the above-described problems, the present disclosure has been created. Objects of the present disclosure are to provide a sealing apparatus and a sealing structure, each of which is capable of inhibiting a sliding resistance from increasing and of thus stabilizing the sliding resistance even when lead seams are formed on a contact target which the lips contact.

In order to achieve the above-described objects, in the present disclosure, a sealing apparatus for sealing a space between an outer periphery side member and an inner periphery side member at least partially enclosed by said outer periphery side member, the outer periphery side member and the inner periphery side member being mutually relatively rotatable about an axis, is characterized by including: an annular reinforcement ring disposed around the axis; and an annular elastic body part attached to the reinforcement ring and disposed around the axis, the annular elastic body part being formed of an elastic body, the elastic body part has: a side lip extending toward one side with respect to the axis and being formed so as to contact the inner periphery side member from another side with respect to the axis in a usage state; an intermediate lip extending toward the one side on an inner periphery side of the side lip and being formed so as to contact the inner periphery side member from the other side in the usage state; and a grease lip extending toward the other side on the other side of the intermediate lip and being formed so as to contact the inner periphery side member from the outer periphery side in the usage state, and in the usage state, in a first space enclosed by the side lip and the intermediate lip of the elastic body part and the inner periphery side member, a ratio of an application volume of a grease applied to the side lip to a spatial volume of the first space is equal to or less than 21%.

In the present disclosure, a sealing apparatus for sealing a space between an outer periphery side member and an inner periphery side member at least partially enclosed by said outer periphery side member, the outer periphery side member and the inner periphery side member being mutually relatively rotatable about an axis, is characterized by including: an annular reinforcement ring disposed around the axis; and an annular elastic body part attached to the reinforcement ring and disposed around the axis, the annular elastic body part being formed of an elastic body, the elastic body part has: a side lip extending toward one side with respect to the axis and being formed so as to contact the inner periphery side member from another side with respect to the axis in a usage state; an intermediate lip extending toward the one side on an inner periphery side of the side lip and being formed so as to contact the inner periphery side member from the other side in the usage state; and a grease lip extending toward the other side on the other side of the intermediate lip and being formed so as to contact the inner periphery side member from the outer periphery side in the usage state, and, in the usage state, in a second space enclosed by the intermediate lip and the grease lip of the elastic body part and the inner periphery side member, an application volume of a grease applied to the intermediate lip and the grease lip is equal to or less than 33% with respect to a spatial volume of the second space.

In the present disclosure, the sealing apparatus is characterized in that the grease is applied to an inner peripheral side surface of each of the side lip, the intermediate lip, and the grease lip, and a thickener of the grease includes no urea-based thickener.

In the present disclosure, the sealing apparatus is characterized in that on a surface of each of the side lip, the intermediate lip, and the grease lip on the inner periphery side, a pearskin part is formed.

In the present disclosure, the sealing apparatus is characterized in that a surface roughness of the pearskin part is equal to or greater than 7 µmRz.

In the present disclosure, a sealing structure is characterized by including: an outer periphery side member; an inner periphery side member at least partially enclosed by the outer periphery side member, the outer periphery side member and the inner periphery side member being mutually relatively rotatable about an axis; and a sealing apparatus sealing a space between the outer periphery side member and the inner periphery side member, the sealing apparatus includes: an annular reinforcement ring disposed around the axis; and an annular elastic body part attached to the reinforcement ring and disposed around the axis, the annular elastic body part being formed of an elastic body, the elastic body part has: a side lip extending toward one side with respect to the axis and being formed so as to contact the inner periphery side member from another side with respect to the axis in a usage state; an intermediate lip extending toward the one side on an inner periphery side of the side lip and being formed so as to contact the inner periphery side member from the other side in the usage state; and a grease lip extending toward the other side on the other side of the intermediate lip and being formed so as to contact the inner periphery side member from the outer periphery side in the usage state, and in the usage state, in a first space enclosed by the side lip and the intermediate lip of the elastic body part and the inner periphery side member, a ratio of an application volume of a grease applied to the side lip to a spatial volume of the first space is equal to or less than 21%.

In the present disclosure, a sealing structure is characterized by including: an outer periphery side member; an inner periphery side member at least partially enclosed by the outer periphery side member, the outer periphery side member and the inner periphery side member being mutually relatively rotatable about an axis; and a sealing apparatus sealing a space between the outer periphery side member and the inner periphery side member, the sealing apparatus includes: an annular reinforcement ring disposed around the axis; and an annular elastic body part attached to the reinforcement ring and disposed around the axis, the annular elastic body part being formed of an elastic body, the elastic body part has: a side lip extending toward one side with respect to the axis and being formed so as to contact the inner periphery side member from another side with respect to the axis in a usage state; an intermediate lip extending toward the one side on an inner periphery side of the side lip and being formed so as to contact the inner periphery side member from the other side in the usage state; and a grease lip extending toward the other side on the other side of the intermediate lip and being formed so as to contact the inner periphery side member from the outer periphery side in the usage state, and, in the usage state, in a second space enclosed by the intermediate lip and the grease lip of the elastic body part and the inner periphery side member, an application volume of a grease applied to the intermediate lip and the grease lip is equal to or less than 33% with respect to a spatial volume of the second space.

According to the present disclosure, a sealing apparatus and a sealing structure, each of which is capable of inhibiting a sliding resistance from increasing and of thus stabilizing the sliding resistance even when lead seams are formed on a contact target which lips contact, can be realized.

BRIEF DESCRIPTION OF DRAWINGS

[FIG. 8] A table showing relationship of application volumes of a grease and increases and fluctuations of a torque in Examples 1 to 4 of the present disclosure.

[FIG. 9] A table showing relationship of application volumes of the grease and increases and fluctuations of a torque in Comparative Examples 1 and 2 of the present disclosure.

DETAILED DESCRIPTION

Embodiments of the Present Disclosure

Hereinafter, embodiments of the present disclosure will be described with reference to the accompanying drawings.

Figure 1:
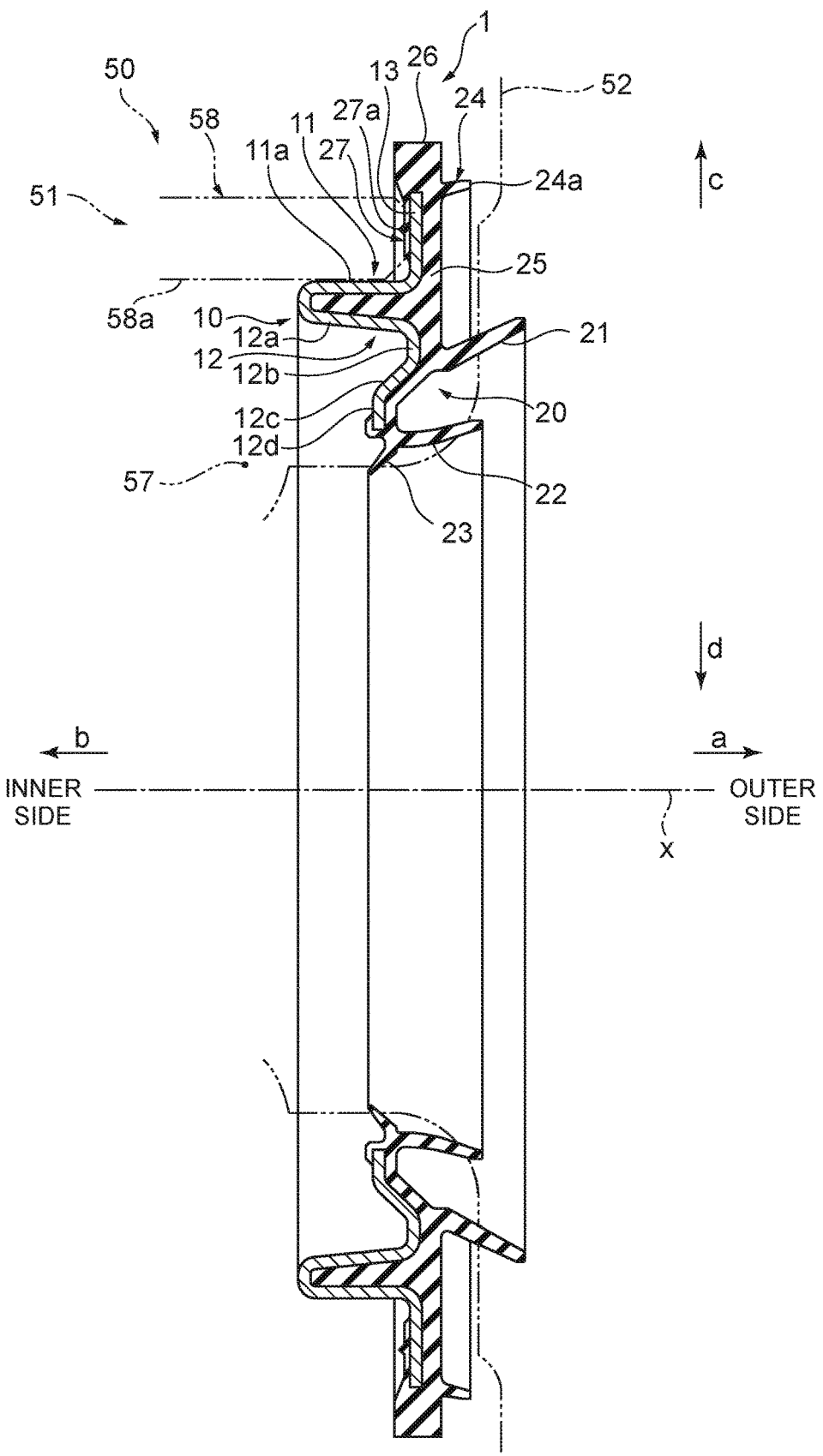
[FIG. 1] A cross-sectional view in a cross section along an axis for showing a schematic configuration of a sealing apparatus according to an embodiment of the present disclosure.

FIG. 1 is a cross-sectional view in a cross section along an axis for showing a schematic configuration of a sealing apparatus 1 according to the embodiment of the present disclosure. The sealing apparatus 1 according to the present disclosure is a sealing apparatus for sealing a space between an outer periphery side member and an inner periphery side member at least partially enclosed by this outer periphery side member, which are mutually relatively rotatable about an axis. The sealing apparatus 1 is, as described later, used to seal a space between an outer ring 51 and a hub 52 in a hub bearing 50.

Hereinafter, in order to facilitate the description, in an axis x direction, a side in an arrow a (see FIG. 1) direction (one side in the axis direction) is defined as an outer side, and in the axis x direction, a side in an arrow b (see FIG. 1) direction (another side in the axis direction) is defined as an inner side. More specifically, the outer side is in a direction away from the space, between the outer ring 51 and the hub 52, which is a space targeted for sealing, and the inner side is in a direction approaching this space targeted for sealing. In addition, in a direction perpendicular to the axis x (hereinafter, also referred to as a "radial direction"), a side in a direction away from the axis x (an arrow c direction in FIG. 1) is defined as an outer periphery side, and a side in a direction approaching the axis x (an arrow d direction in FIG. 1) is defined as an inner periphery side.

As shown in FIG. 1, the sealing apparatus 1 includes a reinforcement ring 10 which is annular around the axis x and an elastic body part 20 which is annular around the axis x, is attached to the reinforcement ring 10, and is formed of an elastic body. The elastic body part 20 has a side lip 21, an intermediate lip 22, and a grease lip (radial lip) 23. In the later-described usage state, the side lip 21 is an annular lip-shaped portion which is formed so as to contact the hub 52 as the inner periphery side member from the other side (inner side) in the axis x direction and extends toward the one side (outer side) in the axis x direction. In the usage state, the intermediate lip 22 is an annular lip-shaped portion which is formed so as to contact the hub 52 from the one side (inner side) and extends toward the one side (outer side) on the inner periphery side of the side lip 21. In the usage state, the grease lip 23 is an annular lip-shaped portion which is formed so as to contact the hub 52 from the outer periphery side and extends toward the other side (inner side) on the other side (inner side) in the axis x direction of the intermediate lip 22.

Specifically, the reinforcement ring 10 is an annular metallic member with the axis x as a center or a substantial center and is formed so as to be press-inserted into an annular through hole 57 of the outer ring 51 of the later-described hub bearing 50 to be fitted thereto. The reinforcement ring 10 is press-inserted into the outer ring 51, whereby the sealing apparatus 1 is fixed to the outer ring 51. As shown in FIG. 1, the reinforcement ring 10 includes, for example, a cylindrical fitting part 11 located on the outer periphery side, a position adjustment part 12 extending from an end portion of an inner side of the fitting part 11 to the inner periphery side, and a disk-shaped flange part 13 extending from an end portion of an outer side of the fitting part 11 to the outer periphery side.

The fitting part 11 is a cylindrical or substantially cylindrical portion with the axis x as a center or a substantial center and is formed, on an outer peripheral surface 11a which is a peripheral surface on the outer periphery side, so as to be brought in close contact with, to be fitted to, an inner peripheral surface 58a of an outer side opening part 58 which is an portion of the outer ring 51 on which the through hole 57 is opened on an outer side. The position adjustment part 12 is of a shape allowing the side lip 21, the intermediate lip 22, and the grease lip 23 to be located in desired positions in the sealing apparatus 1. The position adjustment part 12 includes a return part 12a which is a substantially conical cylindrical or substantially cylindrical portion returning from an end portion of the inner side of fitting part 11 to the outer side, a connecting flange part 12b which is a disk-shaped portion extending from an end portion of an outer side of the return part 12a to the inner periphery side, a substantially conically cylindrical return part 12c obliquely extending from an end portion of the connecting flange part 12b on the inner periphery side toward an inner side thereof and the inner periphery side, and a seal flange part 12d which is a disk-shaped portion extending from an end portion of the return part 12c on the inner periphery side to the inner periphery side. The flange part 13 is a hollow disk-shaped or substantially hollow disk-shaped portion stretching in the radial direction with the axis x as a center or a substantial center. The reinforcement ring 10 is formed of a metallic plate as an integrated member through press working or forging. The fitting part 11 and the position adjustment part 12 are mutually integrally continuously coupled to each other, and the fitting part 11 and the flange part 13 are mutually integrally continuously coupled to each other. As a metallic material of the reinforcement ring 10, for example, stainless steel and SPCC (cold-rolled steel) are cited.

The elastic body part 20 is attached to the reinforcement ring 10 and as shown in FIG. 1, is formed integrally with the reinforcement ring 10 so as to cover the reinforcement ring 10 from the outer side. The elastic body part 20 has a base body part 25. The intermediate lip 22 and the grease lip 23 respectively extend from an end portion of the base body part 25 on the inner periphery side. In addition, the side lip 21 extends from the base body part 25 on the outer periphery side of the intermediate lip 22 so as to be separated from the intermediate lip 22 in the radial direction. The base body part 25 is a portion of the elastic body part 20 stretching on a surface of the reinforcement ring 10 on the outer side over the flange part 13, the fitting part 11, and the position adjustment part 12 of the reinforcement ring 10. The elastic body part 20 is integrally attached to the reinforcement ring 10 in the base body part 25.

The side lip 21 extends from the base body part 25 toward the outer side in an annular shape with the axis x as a center or a substantial center. In the later-described usage state of the sealing apparatus 1 in which the sealing apparatus 1 is attached in a desired position in the hub bearing 50, the side lip 21 is formed such that a tip end portion of the side lip 21 contacts the hub 52 (hub ring 55) with predetermined interference. The side lip 21 has, for example, a conical cylindrical shape whose diameter is enlarged toward the outer side in the axis x direction.

The intermediate lip 22 extends from the base body part 25 toward the outer side in an annular shape with the axis x as a center or a substantial center. In the usage state of the sealing apparatus 1, the intermediate lip 22 is formed such that a tip end portion of the intermediate lip 22 contacts the hub 52 (hub ring 55) with predetermined interference. The intermediate lip 22 has, for example, a conical cylindrical shape whose diameter is enlarged toward the outer side in the axis x direction. The intermediate lip 22 may extend toward the outer side in parallel with the side lip 21. As shown in FIG. 1, the intermediate lip 22 may be more gently inclined with respect to the axis x than the side lip 21. In addition, the intermediate lip 22 may be more steeply inclined with respect to the axis x than the side lip 21.

The grease lip 23 extends from the base body part 25 toward the inner side and the inner periphery side in an annular shape with the axis x as a center or a substantial center. In the usage state of the sealing apparatus 1, the grease lip 23 is formed such that a tip end portion of the grease lip 23 contacts the hub 52 (hub ring 55) with predetermined interference.

Figure 2:
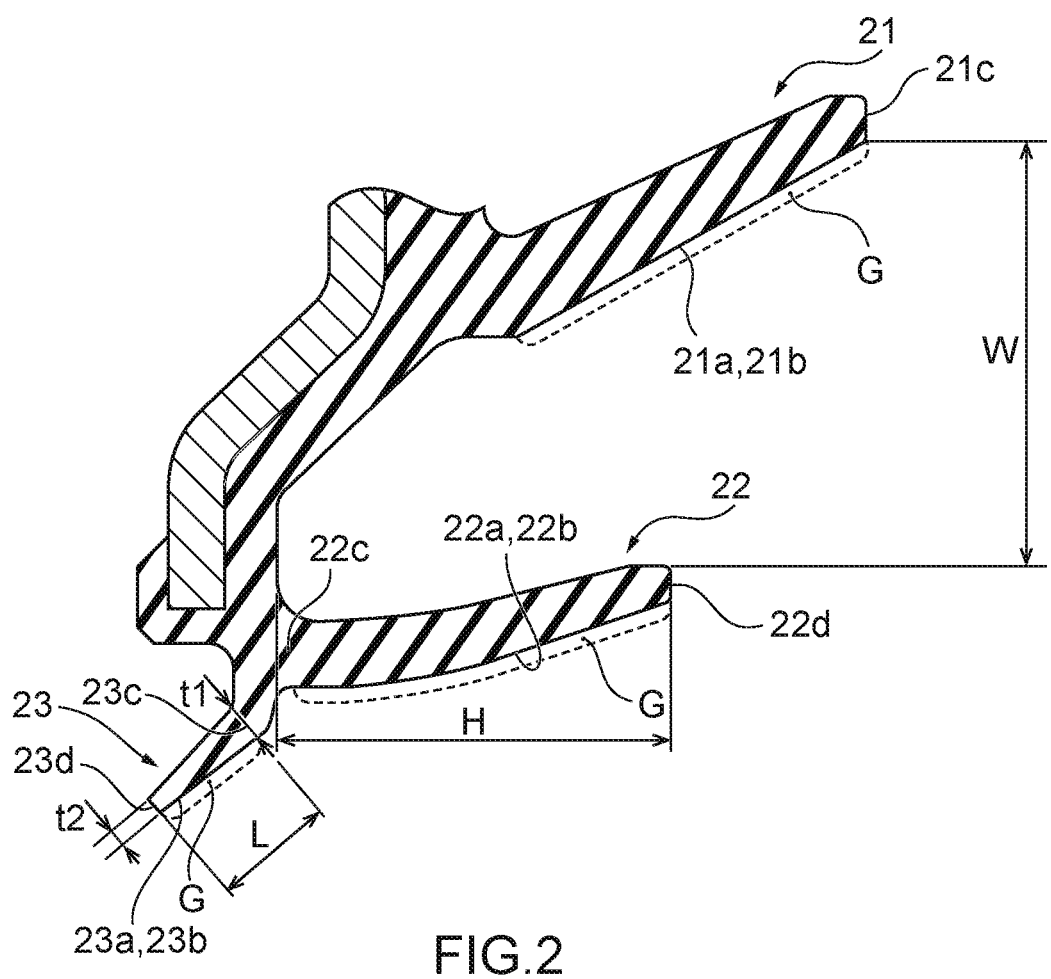
[FIG. 2] A partially enlarged cross-sectional view showing the vicinity of a side lip, an intermediate lip, and a grease lip of the sealing apparatus shown in FIG. 1.

In addition, as shown in FIG. 2, a shape of the grease lip 23 is designed such that a length L in an extending direction and a thickness t in a cross section along the axis x satisfy relationship of t/L≥0.27. An extending direction length L which is the length of the grease lip 23 in the extending direction is a distance in the extending direction between a grease lip base end 23c which is a root of the grease lip 23 (a portion coupled with the base body part 25) and a grease lip tip end 23d which is a tip end of the grease lip 23. In addition, a cross section thickness t which is the thickness of the grease lip 23 is a thickness in a direction orthogonal to the extending direction of the grease lip 23 in the cross section along the axis x. In the present embodiment, the shape is designed such that a thickness (cross section thickness t1) of the grease lip 23 in the grease lip base end 23c of the grease lip 23 shown in FIG. 2 satisfies the relationship of the above-mentioned t/L≥0.27. In other words, the grease lip 23 has the shape which achieves t1/L≥0.27. A value of the cross section thickness t of the grease lip 23 is designed such that a cross section thickness t1 in the grease lip base end 23c is a maximum value, a thickness of the grease lip 23 decreases in accordance with an increase in the proximity to the grease lip tip end 23d, and a value of a thickness (cross section thickness t2) of the grease lip in the grease lip tip end 23d is a minimum value. A thickness of the grease lip 23 may be even in the extending direction (the cross section thickness t=constant) and may increase in accordance with an increase in the proximity to the grease lip tip end 23d. The cross sectional shape of the grease lip 23 may be other shape. For example, in the cross section, a contour of an outer peripheral surface of the grease lip 23 may be a curve, instead of a straight line or a substantially straight line. Similarly, in the cross section, a contour of an inner peripheral side surface 23a of the grease lip 23 may be a curve, instead of the straight line or the substantially straight line.

In addition, for the elastic body part 20, an outer peripheral annular projection 24 is formed. The outer peripheral annular projection 24 is an annular projection around the axis x, which is disposed on the outer periphery side of the side lip 21 and projects toward the outer side, and is formed so as to form a gap in a space with the hub 52 (hub ring 55) in an outer side end 24a which is a tip end on the outer side. Specifically, the outer peripheral annular projection 24 projects from an end portion of the base body part 25 on the outer periphery side toward the outer side and extends with the axis x as a center or a substantial center. As shown in FIG. 1, the outer peripheral annular projection 24 obliquely projects from the base body part 25 toward the outer side and the outer periphery side.

In addition, the elastic body part 20 has a weir part 26, on the outer periphery side of the outer peripheral annular projection 24, which is an annular portion projecting toward the outer periphery side. In the state in which the sealing apparatus 1 is attached to the outer ring 51, as described later, the weir part 26 is formed so as to project on the outer periphery side of an outer side end surface 58b (FIG. 4) which is a portion contacting the sealing apparatus 1 in the axis x direction of the outer ring 51. For example, as shown in FIG. 1, the weir part 26 is formed so as to cover, on the outer periphery side, an end portion of the flange part 13 of the reinforcement ring 10 on the outer periphery side.

In addition, as shown in FIG. 1, the elastic body part 20 has a gasket part 27 which at least partially covers a surface of an inner side of the flange part 13 of the reinforcement ring 10. The gasket part 27 stretches in an annular shape around the axis x and adjoins to an end portion of the weir part 26 on the inner periphery side.

The elastic body part 20 is attached integrally with the reinforcement ring 10. The above-described side lip 21, intermediate lip 22, grease lip 23, outer peripheral annular projection 24, base body part 25, weir part 26, and gasket part 27 are portions of the elastic body part 20 formed as an integral member and integrally adjoin to one another. As a material of the elastic body of the elastic body part 20, for example, a variety of rubber materials are cited. As the variety of rubber materials, for example, synthetic rubbers such as nitrile rubber (NBR), hydrogenated nitrile rubber (H-NBR), acrylic rubber (ACM), and fluoro-rubber (FKM) are cited.

In addition, on respective surfaces (inner peripheral side surfaces 21a, 22a, and 23a) of the side lip 21, the intermediate lip 22, and the grease lip 23 on the inner periphery side, pearskin parts 21b, 22b, and 23b are formed.

Specifically, as shown in FIG. 2, the inner peripheral side surface 21a (a surface facing a dotted line in FIG. 2) which is a surface of the side lip 21 on the inner periphery side has been subjected to pearskin finishing, and on a surface of the inner peripheral side surface 21a, minute projections and depressions are formed and the pearskin part 21b is formed. As described above, the inner peripheral side surface 21a of the side lip 21 constitutes the pearskin part 21b. For example, a surface roughness of the pearskin part 21b is equal to or greater than 7 μmRz. Note that a ten-point average roughness (Rz), specified by JIS, of the pearskin part 21b conforms to JIS B0601:1994.

Similarly, as shown in FIG. 2, the inner peripheral side surface 22a (a surface facing a dotted line in FIG. 2) which is a surface of the intermediate lip 22 on the inner periphery side has been subjected to the pearskin finishing, and on a surface of the inner peripheral side surface 22a, minute projections and depressions are formed and the pearskin part 22b is formed. As described above, the inner peripheral side surface 22a of the intermediate lip 22 constitutes the pearskin part 22b. For example, a surface roughness of the pearskin part 22b is equal to or greater than 7 μmRz.

Similarly, as shown in FIG. 2, the inner peripheral side surface 23a (a surface facing a dotted line in FIG. 2) which is a surface of the grease lip 23 on the inner periphery side has been subjected to the pearskin finishing, and on a surface of the inner peripheral side surface 23a, minute projections and depressions are formed and the pearskin part 23b is formed. As described above, the inner peripheral side surface 23a of the grease lip 23 constitutes the pearskin part 23b. For example, a surface roughness of the pearskin part 23b is equal to or greater than 7 μmRz.

In addition, a grease G as a lubricant is applied to the inner peripheral side surfaces 21a, 22a, and 23a of the side lip 21, the intermediate lip 22, and the grease lip 23, respectively. In other words, as shown in FIG. 2, the grease G may be applied to the inner peripheral side surfaces 21a, 22a, and 23a along the dotted lines, respectively. In the later-described usage state, the sealing apparatus 1 has the grease G applied thereto to be used as described above.

A thickener of the grease G includes no urea-based thickener containing a urea group or groups. Alternatively, the thickener of the grease G includes a small amount of the urea-based thickener. When the thickener of the grease G includes the small amount of the urea-based thickener, it is only required for a ratio of the urea-based thickener in the thickener of the grease G to be in a range in which effect to inhibit the grease G from being scraped out along the lead seams upon rotating the hub 52, which is the later-described effect of the grease G, can be exhibited.

As the grease G, the heretofore known grease which satisfies the above-described conditions can be adopted. The grease G is constituted of a base oil, an additive, and the thickener. For example, base oils, additives, and thickeners below cited are used.

As kinds of the base oils, all of oils (a mineral oil-based, synthetic oil-based, or natural oil-based lubricant oil) ordinarily used as base oils for a lubricant oil can be used. Specifically, as the mineral oil-based lubricant oil, a mineral oil can be used which is refined by appropriately combining reduced pressure distillation, oil agent deasphalting, solvent extraction, hydrogenolysis, solvent dewaxing, sulfuric acid cleaning, white clay refining, hydrogenation refining, and the like. As the synthetic oil-based lubricant oil, a hydrocarbon-based oil, an aromatic-based oil, an ester-based oil, an ether-based oil, and the like are cited. As the natural oil-based lubricant oil, a fat-based oil such as a beef fat, a pork fat, a soybean oil, a canola oil, a rice bran oil, a coconut oil, a palm oil, and a palm kernel oil or hydrides of the above-mentioned fat based oils are cited. Each of these base oils can be used singly or these base oils can be used in combination as a mixture, and a desired base oil kinematic viscosity is adjusted. Note, however, that in consideration of affinity with the nitrile rubber which is generally used as an elastic material for the seal member, the mineral oil or the hydrocarbon-based oil is preferable.

As the thickener, for example, metal soaps such as a metal soap whose metal component is Li, Na, or the like and a multicomponent metal soap whose metal components are Li, Na, Ba, Ca, and the like; non-soaps such as BENTONE, silica gel, and urethane compound; an amino acid-based gelling agent (N-2-ethyl-hexanoyl-L-glutamic acid dibutylamide; N-lauroyl-L-glutamic acid-α, γ-n-dibutylamide; or the like); a benzylidene sorbitol derivative (dibenzylidene sorbitol, JITORIRIDEN sorbitol, asymmetric dialkyl benzylidene sorbitol, or the like) can be appropriately selected to be used. Each of these thickeners can be used singly or these thickeners can be used in combination as a mixture.

Note that as the urea-based thickener, a thickener using a urea compound and a thickener using a urea-urethane compound are cited.

In accordance with purposes, an additive or additives may be added to the grease G. For example, an antioxidizing agent such as an amine-based agent, a phenol-based agent, a sulfur-based agent, zinc dithiophosphate, and zinc dithiocarbamate; an antirust agent such as sulfonic acid metal salt, an ester-based agent, an amine-based agent, naphthenic acid metal salt, a succinic acid derivative; an extreme pressure agent such as a phosphorus-based agent, zinc dithiophosphate, and organic molybdenum; an oiliness-improving agent such as fatty acids and animal and vegetable oils; a metal deactivator such as benzotriazole; and the like can be used. The additives conventionally used for lubrication can be added singly or in combination. Note that an added amount of each of these additives is not particularly limited, and it is only required for the added amount thereof to be in a range in which objects of the present disclosure are not impaired.

Figure 3:
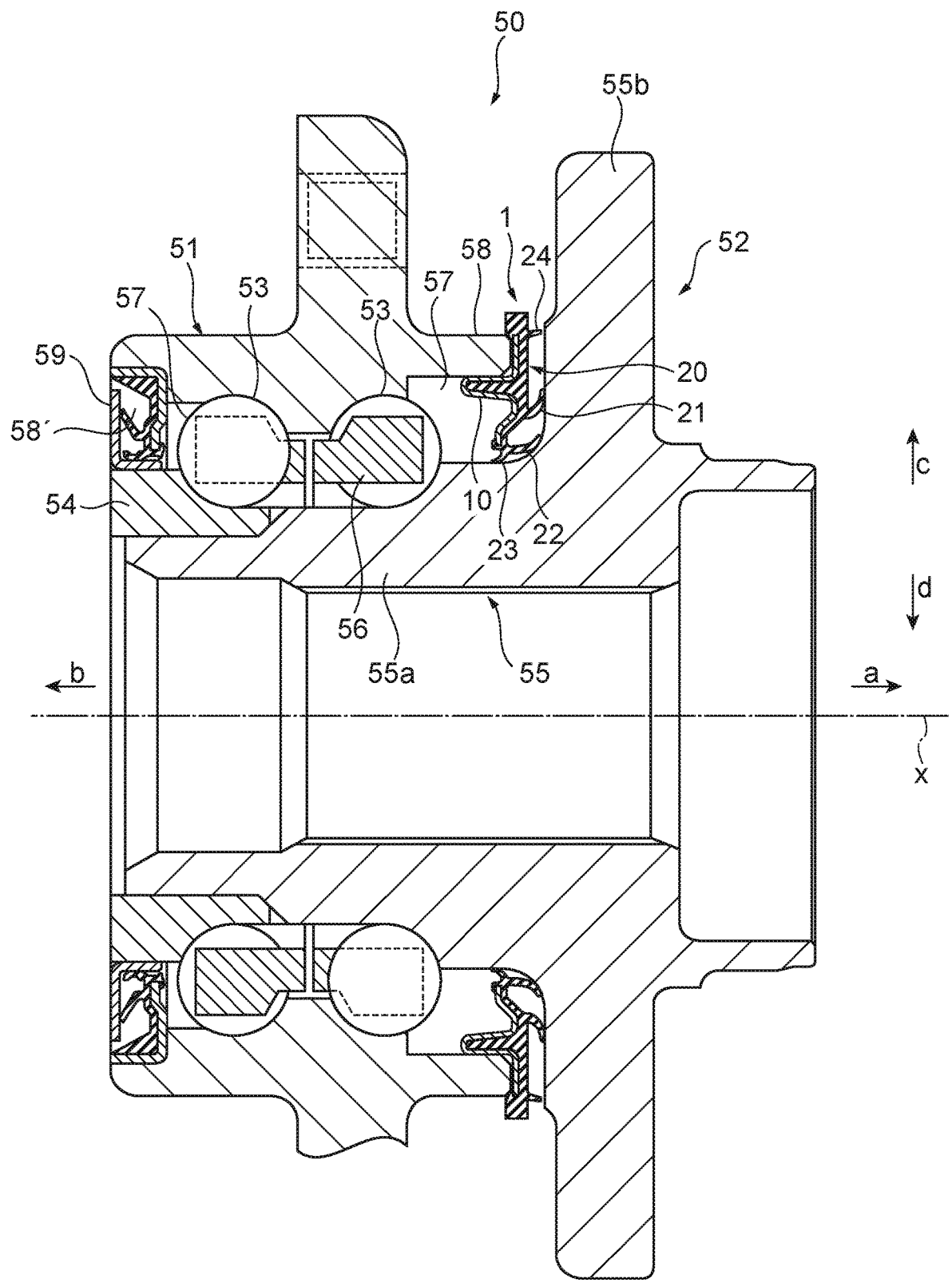
[FIG. 3] A cross-sectional view of a hub bearing in a cross section along the axis for showing a usage state of the sealing apparatus attached to the hub bearing.
Figure 4:
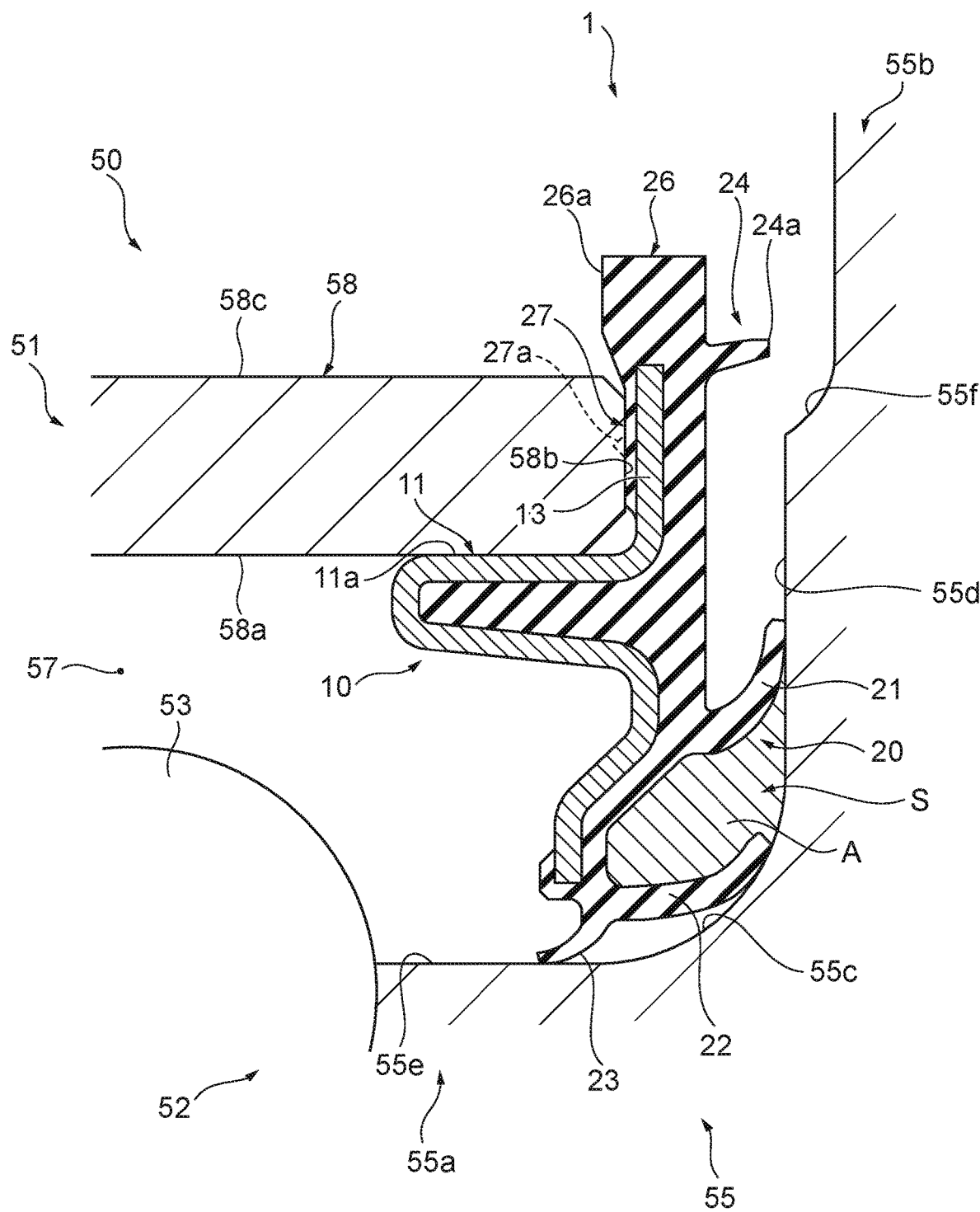
[FIG. 4] A partially enlarged cross-sectional view of the vicinity of the sealing apparatus shown in FIG. 3.

Thereafter, the usage state of the sealing apparatus 1 will be described. FIG. 3 is a cross-sectional view of the hub bearing 50 in a cross section along the axis x for showing the usage state of the sealing apparatus 1 which is attached to the hub bearing 50. FIG. 4 is a partially enlarged cross-sectional view of the vicinity of the sealing apparatus 1 shown in FIG. 3. As shown in FIG. 3, the hub bearing 50 is the heretofore known hub bearing, is provided in a vehicle or the like, and rotatably supports a wheel in an axle or a suspension. Specifically, as shown in FIG. 3, the hub bearing 50 includes the annular outer ring 51, as an outer periphery side member, which is annular with the axis x as a center or a substantial center, the hub 52 as an inner periphery side member which is relatively rotatable with respect to the outer ring 51 and is partially enclosed by the outer ring 51 with the axis x as a center or a substantial center, and a plurality of bearing balls 53 arranged between the outer ring 51 and the hub 52. In the usage state of the hub bearing 50 attached in a vehicle or the like, the outer ring 51 is fixed, and the hub 52 is relatively rotatable with respect to the outer ring 51. Specifically, the hub 52 has an inner ring 54 and the hub ring 55. The hub ring 55 has a cylindrical or substantially cylindrical axis part 55a which extends along the axis x and a wheel attaching flange 55b. The wheel attaching flange 55b is a portion which stretches in a disk shape from one end of the axis part 55a (an end portion of the outer side in the hub bearing 50) toward the outer periphery side and which is a portion to which a wheel, not shown, is attached by a plurality of hub bolts. The axis part 55a and the wheel attaching flange 55b are smoothly connected with each other in the inner side. A transition part 55c which is a portion where the axis part 55a and the wheel attaching flange 55b are connected with each other in the inner side has a contour smoothly curving in a circular arc shape or an arc shape in a cross section along the axis x. In order to hold the bearing balls 53 inside a space between the outer ring 51 and the inner ring 54, the inner ring 54 is fitted to an end portion of the inner side (a side in the arrow b direction) of the axis part 55a of the hub ring 55. Inside the space between the outer ring 51 and the hub 52, the bearing balls 53 are held by a holder 56.

The outer ring 51 has the annular through hole 57 which extends in the axis x direction. The axis part 55a of the hub ring 55 of the hub 52 is inserted into this through hole 57, and an annular space which extends along the axis x is formed between the axis part 55a and the through hole 57. Inside this space, as described above, the bearing balls 53 are housed and held by the holder 56. In addition, a lubricant is applied to the inside of this space or the inside thereof is filled with the lubricant. The sealing apparatus 1 is attached to the outer side opening part 58 of the outer ring 51, which forms an opening where a space between the axis part 55a and the through hole 57 is opened on the outer side (a side in the arrow a direction). Another sealing apparatus 59 is attached to an inner side opening part 58' of the outer ring 51 which forms an opening where a space between the axis part 55a and the through hole 57 is opened on the inner side (a side in the arrow b direction). The sealing apparatuses 1 and 59 serve to seal the spaces between the axis part 55a and the inner ring 54 as well as between the axis part 55a and the through hole 57, serve to prevent the lubricant thereinside from leaking to the outside, and serve to prevent foreign substances from entering the inside from the outside. The sealing apparatus 59 is the heretofore known sealing apparatus, and detailed description therefor is omitted. In addition, as the sealing apparatus 59, the sealing apparatus 1 can also be adopted. In this case, in the hub bearing 50, the outer side is a side in the arrow b direction and the inner side is a side in the arrow a direction. A configuration of the hub bearing for which the sealing apparatus 1 is adopted is not limited to the above-described configuration of the hub bearing 50.

As shown in FIG. 4, the sealing apparatus 1 is attached to the outer side opening part 58 of the outer ring 51. Specifically, the fitting part 11 of the reinforcement ring 10 is press-inserted and fitted into the outer side opening part 58 of the outer ring 51, whereby the sealing apparatus 1 is fixed to the outer ring 51. The outer peripheral surface 11a of the fitting part 11 of the reinforcement ring 10 is closely attached to the inner peripheral surface 58a of the outer side opening part 58 of the outer ring 51, which faces in an inner peripheral direction, thereby serving to seal up between the reinforcement ring 10 and the outer ring 51. In addition, in the usage state, as shown in FIG. 4, the reinforcement ring 10 is attached to the outer ring 51 such that the flange part 13 presses the gasket part 27 of the elastic body part 20, which stretches on the inner side, against the outer side end surface 58b which forms an annular surface facing the outer side of the outer side opening part 58. Thus, between the outer side end surface 58b and the flange part 13, the gasket part 27 is compressed, thereby serving to enhance sealability between the outer ring 51 and the sealing apparatus 1 in the outer side end surface 58b. It is preferable that as shown in FIG. 1 and FIG. 4, for the gasket part 27, a bead 27a which is an annular projection projecting toward the inner side is formed. In the usage state, the bead 27a is pressed against the outer side end surface 58b of the outer side opening part 58, thereby allowing further enhancement of sealability between the outer ring 51 and the sealing apparatus 1 on the outer side end surface 58b. The gasket part 27 may have no bead 27a.

In addition, in the usage state, the weir part 26 of the elastic body part 20 projects over the outer side end surface 58b of the outer side opening part 58 to the outer periphery side and over the outer peripheral surface 58c of the outer side opening part 58, which faces in an outer peripheral direction, to the outer periphery side. Therefore, in the usage state, even if foreign substances such as rain water, muddy water, and dust move along the outer peripheral surface 58c of the outer side opening part 58 of the outer ring 51 toward the outer side, the foreign substances collide with an inner side surface 26a which is a surface facing an inner side of the weir part 26, and movement of the foreign substances further toward the outer side is blocked. As described above, the foreign substances are inhibited from entering in a side lip 21 direction along the outer peripheral surface 58c of the outer side opening part 58 of the outer ring 51.

In the usage state, a tip end portion of the side lip 21 contacts a surface of the hub ring 55, for example, a surface (inner side surface 55d) facing an inner side of the wheel attaching flange 55b in a portion (contact width) corresponding to the above-described predetermined interference so as to make the hub ring 55 slidable. In addition, a tip end portion of the intermediate lip 22 contacts a surface of the hub ring 55, for example, the transition part 55c in a portion (contact width) corresponding to the above-described predetermined interference so as to make the hub ring 55 slidable. In addition, a tip end portion of the grease lip 23 contacts a surface of the hub ring 55, for example, an outer peripheral surface 55e which is a surface of the axis part 55a on the outer periphery side in a portion (contact width) corresponding to the above-described predetermined interference so as to make the hub ring 55 slidable. The side lip 21 and the intermediate lip 22 serve to prevent foreign substances from entering the inside of the through hole 57, and the grease lip 23 serves to prevent the lubricant from leaking from the inside of the through hole 57.

In addition, in the usage state, the outer side end 24a of the outer peripheral annular projection 24 faces the inner side surface 55d of the wheel attaching flange 55b of the hub ring 55 with a minute gap in the axis x direction, and the outer peripheral annular projection 24 does not contact the wheel attaching flange 55b. By forming a minute space between the outer side end 24a and the wheel attaching flange 55b, the outer peripheral annular projection 24 may form a labyrinth seal.

As shown in FIG. 4, on the inner side surface 55d of the wheel attaching flange 55b of the hub ring 55, a level difference 55f may be formed on the outer periphery side. In the level difference 55f, a portion of the inner side surface 55d on the outer periphery side is recessed toward the outer side of a portion thereof on the inner periphery side. The outer peripheral annular projection 24 extends on the outer periphery side of the level difference 55f.

As described above, in the usage state in which the sealing apparatus 1 is attached to the hub bearing 50, the side lip 21 contacts the hub ring 55 (wheel attaching flange 55b) in a portion of the predetermined interference of the inner peripheral side surface 21a, and the intermediate lip 22 contacts the hub ring 55 (wheel attaching flange 55b) in a portion of the predetermined interference of the inner peripheral side surface 22a. The side lip 21, the intermediate lip 22, and the wheel attaching flange 55b of the hub ring 55 define an inter-lip space S which is an annular space. In this usage state, an inter-lip space cross sectional area A which is an area (cross sectional area) of the inter-lip space S enclosed by the side lip 21, the intermediate lip 22, and the hub ring 55 in a cross section along the axis x is equal to or greater than 3.5 mm$^2$. In other words, respective shapes of the side lip 21 and the intermediate lip 22 are designed such that the inter-lip space cross sectional area A which is a cross sectional area of the inter-lip space S in the usage state is set to be A≥3.5 mm$^2$.

As described above, in the sealing apparatus 1 in the usage state, the side lip 21 contacts the inner side surface 55d of the wheel attaching flange 55b of the hub ring 55 with the predetermined interference, the intermediate lip 22 contacts the transition part 55c of the wheel attaching flange 55b with the predetermined interference, and the grease lip 23 contacts the outer peripheral surface 55e of the axis part 55a of the hub ring 55 with the predetermined interference, whereby the sealing apparatus 1 serves to seal of the space between the outer ring 51 and the hub 52.

By employing the sealing apparatus 1, even when the lead seams which are finishing marks of processing are formed on the outer peripheral surface 55e, the transition part 55c, and the inner side surface 55d of the hub ring 55, the entire abutting of the side lip 21, the intermediate lip 22, and the grease lip 23 can be inhibited from occurring. This is because the inter-lip space cross sectional area A which is the cross sectional area of the inter-lip space S enclosed by the side lip 21, the intermediate lip 22, and the hub ring 55 is equal to or greater than 3.5 mm$^2$. As the reason why the entire abutting of the side lip, the intermediate lip, and the grease lip occurs when in the conventional sealing apparatus, the lead seams are formed on the hub ring, it is considered that due to pump effect of the lead seams, a negative pressure is generated in the space enclosed by the side lip, the intermediate lip, and the hub ring. In contrast to this, in the sealing apparatus 1, the shapes of the side lip 21 and the intermediate lip 22 are designed such that the inter-lip space cross sectional area A in the usage state is set to be equal to or greater than 3.5 mm$^2$. Therefore, even when the hub 52 rotates in the usage state, influence of the pump effect exerted by the lead seams on the inter-lip space S is reduced. In other words, by setting the inter-lip space cross sectional area A to be A≥3.5 mm$^2$, the influence of the pump effect exerted by the lead seams on the inter-lip space S can be reduced, and the negative pressure which increases contact widths of the lips 21 to 23 in the inter-lip space S due to the pump effect of the lead seams can be inhibited from being generated. Therefore, in the sealing apparatus 1, even when the lead seams are formed on the hub ring 55, sliding resistances of the side lip 21, the intermediate lip 22, and the grease lip 23 against the hub ring 55 can be inhibited from increasing.

The larger the inter-lip space cross sectional area A of the inter-lip space S is, the better. This is because the larger the inter-lip space cross sectional area A is, the more the influence of the pump effect of the lead seams can be reduced. Note, however, that an upper limit of a size of the inter-lip space cross sectional area A can be determined in accordance with a specific form of the sealing apparatus 1 which deals with a specific application target (hub bearing). Alternatively, the upper limit of the size of the inter-lip space cross sectional area A comes to be determined in accordance with a specific form of the sealing apparatus 1 which deals with a specific application target (hub bearing). In addition, an optimum size of the inter-lip space cross sectional area A of the sealing apparatus 1 can be set, for example, based on a size in the radial direction in a specific mode of the sealing apparatus 1, for example, based on sizes of diameters of the side lip 21 and the intermediate lip 22.

In addition, in the sealing apparatus 1, as described above, the relationship of the cross section thickness t and the extending direction length L of the grease lip 23 is t/L≥0.27. Thus, stiffness of the grease lip 23 can be appropriately adjusted, the entire abutting of the grease lip 23 can be inhibited, and a sliding resistance of the grease lip 23 against the hub ring 55 can be inhibited from increasing. In a case in which the relationship of the cross section thickness t and the extending direction length L of the grease lip 23 is t/L≥0.27, even when a use environment of the sealing apparatus 1 is changed from 20° C. to 120° C., that is, even when a pressure inside the through hole 57 of the hub bearing 50 is changed, the entire abutting of the grease lip 23 can be inhibited.

Note that in the sealing apparatus 1, the inter-lip space cross sectional area A of the inter-lip space S enclosed by the side lip 21, the intermediate lip 22, and the hub ring 55 may be equal to or greater than 3.5 mm$^2$. In this case, in the sealing apparatus 1, by setting the inter-lip space cross sectional area A to be equal to or greater than 3.5 mm$^2$, sliding resistances of the side lip 21, the intermediate lip 22, and the grease lip 23 against the hub ring 55 can be furthermore inhibited from increasing.

In addition, in the sealing apparatus 1, the respective inner peripheral side surfaces 21a to 23a of the side lip 21, the intermediate lip 22, and the grease lip 23 have been subjected to the pearskin finishing, and the pearskin parts 21b to 23b are formed on the respective inner peripheral side surfaces 21a to 23a. The surface roughness of each of the pearskin parts 21b to 23b is equal to or greater than 7 µmRz. As described above, since the surface roughness of each of the pearskin parts 21b to 23b is set to be equal to or greater than 7 µmRz, as compared with a case in which the surface roughness of each thereof is smaller than 7 µmRz, a contact area between the lead seams of the hub ring 55 and each of the side lip 21, the intermediate lip 22, and the grease lip 23 is decreased, thereby allowing the pump effect to be reduced. Thus, the entire abutting of the side lip 21, the intermediate lip 22, and the grease lip 23 to the hub ring 55 can be inhibited, and the sliding resistances of the side lip 21, the intermediate lip 22, and the grease lip 23 against the hub ring 55 can be inhibited from increasing.

In addition, the larger the surface roughness of each of the pearskin parts 21b to 23b is, the smaller the sliding resistance of each of the side lip 21, the intermediate lip 22, and the grease lip 23 against the hub ring 55 can be made. However, the larger the surface roughness of each of the pearskin parts 21b to 23b is, the more sealability of each of the side lip 21, the intermediate lip 22, and the grease lip 23 is reduced. When only the sealability is considered, it is preferable that the surface roughness of each of the pearskin parts 21b to 23b is a value which is equal to or greater than 5 µmRz and equal to or less than 20 µmRz.

When as the grease G applied to the respective lips 21 to 23, the grease including the urea-based thickener is used, upon the rotation of the hub 52, the grease G is easily scraped out along the lead seams. As the reason for this, it is considered that the grease including the urea-based thickener is apt to adhere to metal. When upon the rotation of the hub 52, the grease G is scraped out along the lead seams, the negative pressure is generated in the inter-lip space S. Therefore, when the grease including the urea-based thickener is used, the entire abutting of the side lip 21, the intermediate lip 22, the grease lip 23 occurs, thereby resulting in an increase in the sliding resistance of each of the side lip 21, the intermediate lip 22, and the grease lip 23 against the hub ring 55. In the sealing apparatus 1, as the grease G applied to the respective lips 21 to 23, the grease including no urea-based thickener or the grease including only the small amount of the urea-based thickener in the thickener is used. Therefore, upon the rotation of the hub 52, the grease G is inhibited from being scraped out along the lead seams, the negative pressure which increases the contact width of each of the lips 21 to 23 can be prevented from being generated, and the sliding resistance of each of the side lip 21, the intermediate lip 22, and the grease lip 23 against the hub ring 55 can be inhibited from increasing.

Figure 5:
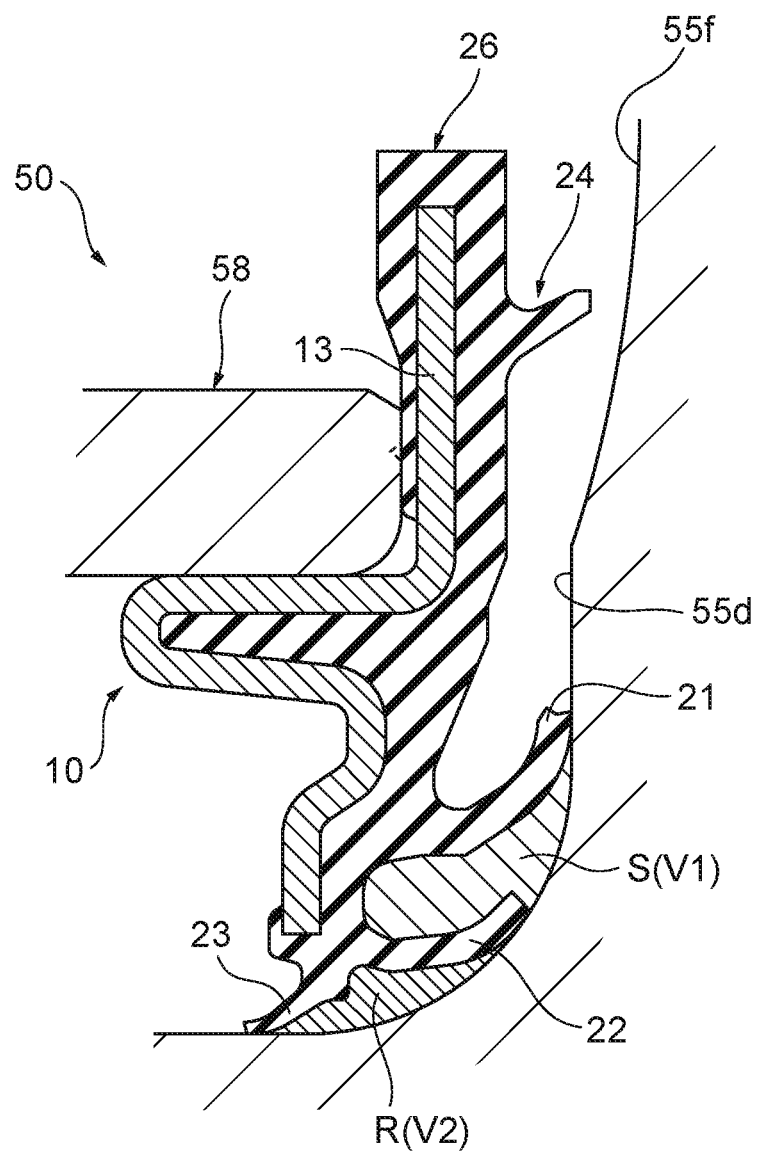
[FIG. 5] A cross-sectional view showing an inter-lip space S formed by the side lip, the intermediate lip, and a hub ring and an inter-lip space R formed by the intermediate lip, the grease lip, and the hub ring in the usage state of the sealing apparatus.

In addition, in the sealing apparatus 1, as shown in FIG. 5, a ratio of an application volume of the grease G to a spatial volume V1 of an inter-lip space S as a first space enclosed by the side lip 21, the intermediate lip 22, and the inner side surface 55d of the hub ring 55 is set to be equal to or less than 21% (note, however, that 0% is excluded because when the ratio thereof is 0%, the sealing apparatus 1 does not exhibit a function as a muddy water seal).

Further, in the sealing apparatus 1, as shown in FIG. 5, a ratio of an application volume of the grease G to a spatial volume V2 of an inter-lip space R as a second space enclosed by the intermediate lip 22, the grease lip 23, and the transition part 55c of the hub ring 55 is set to be equal to or less than 33% (note, however, that 0% is excluded because when the ratio thereof is 0%, the sealing apparatus 1 does not exhibit the function as the muddy water seal).

Here, the spatial volume V1 of the inter-lip space S and the spatial volume V2 of the inter-lip space R can be easily obtained based on dimensions of respective portions of the side lip 21, the intermediate lip 22, the grease lip 23, and the hub ring 55 by using predetermined CAD software (for example, "SOLIDWORKS (registered trademark)" manufactured by Dassault Systemes SolidWorks Corporation or the like).

Figure 6:
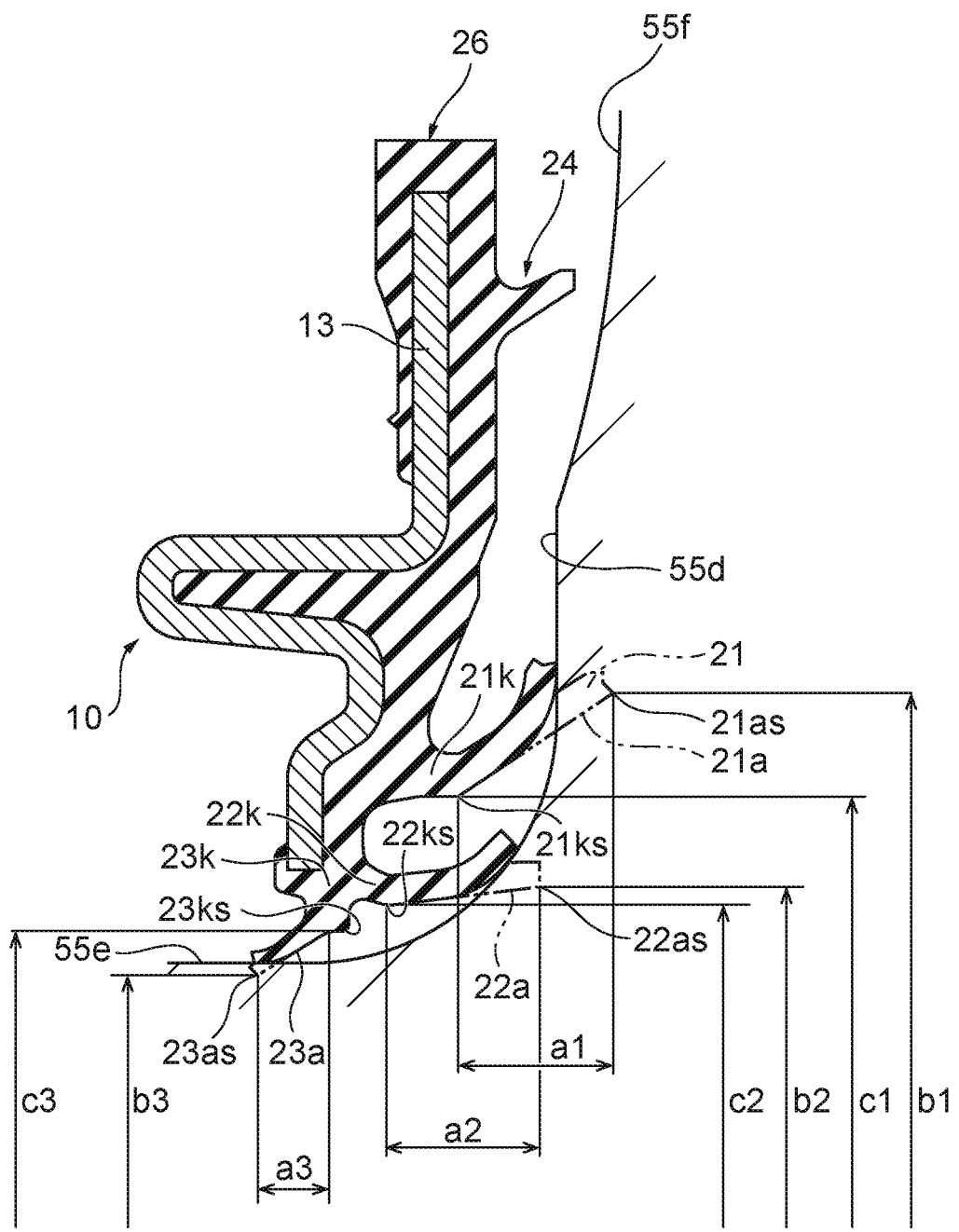
[FIG. 6] A cross-sectional view for illustrating dimensions of the side lip, the intermediate lip, and the grease lip.

Specifically, as shown in FIG. 6, it is only required to input, to the CAD software, a lip height a1 of the side lip 21, an inner diameter 131 of a tip end 21as of the inner peripheral side surface 21a of said side lip 21, an inner diameter c1 of a tip end 21ks of the inner peripheral side surface of a base end portion 21k of said side lip 21, a lip height a2 of the intermediate lip 22, an inner diameter b2 of a tip end 22as of the inner peripheral side surface 22a of said intermediate lip 22, an inner diameter c2 of a tip end 22ks of the inner peripheral side surface of a base end portion 22k of said intermediate lip 22, a lip height a3 of the grease lip 22, an inner diameter b3 of a tip end 23as of the inner peripheral side surface 23a of said grease lip 22, an inner diameter c3 of a tip end 23ks of the inner peripheral side surface of a base end portion 23k of said grease lip 23, and the like as kinds of parameters required for obtaining the spatial volumes V1 and V2.

Figure 7:
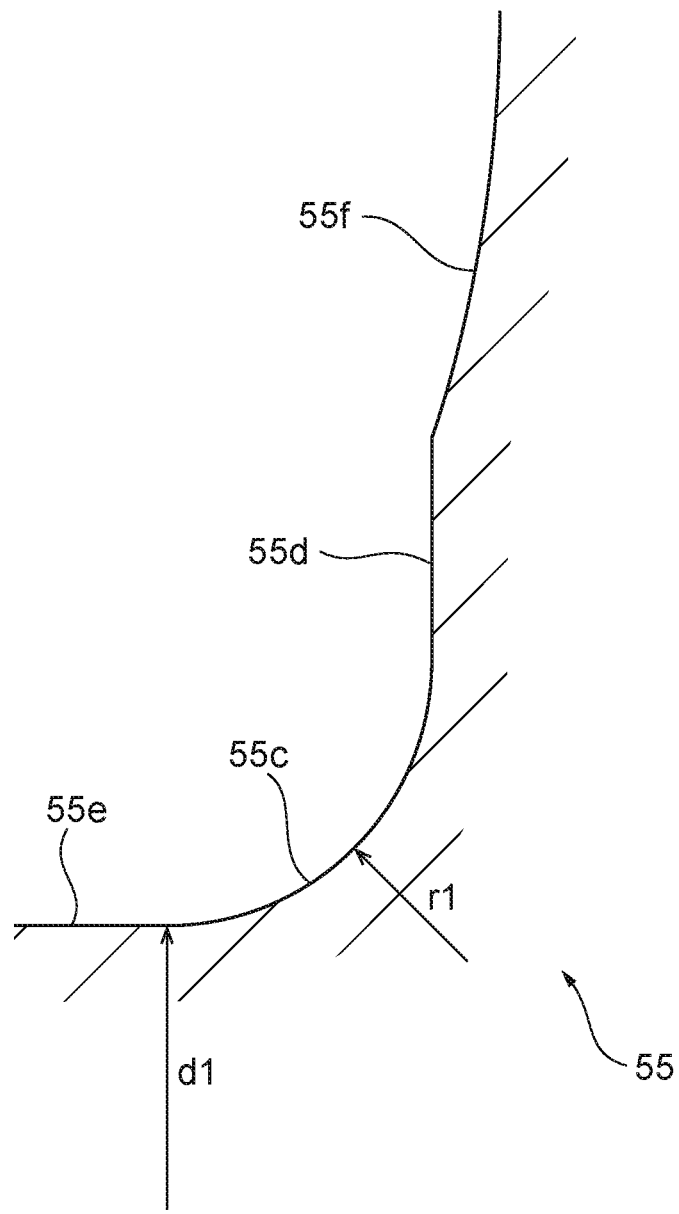
[FIG. 7] A cross-sectional view for illustrating dimensions of a hub ring 55.

In addition, as for the hub ring 55, as shown in FIG. 7, it is only required to input, to the CAD software, an outer diameter d1 of the outer peripheral surface 55e, an R dimension r1 of the transition part 55c, and the like as kinds of parameters of said hub ring 55 required for obtaining the spatial volumes V1 and V2.

As described above, by employing the sealing apparatus 1 according to the embodiment of the present disclosure, even when the lead seams are left on the surface of the hub ring 55, the sliding resistance of each of the lips 21 to 23 against the hub ring 55 can be inhibited from increasing, thereby allowing the sliding resistance to be stabilized.

EXAMPLES

Thereafter, when the sealing apparatus 1 having the above-described configuration was attached to the hub ring 55 of the hub bearing 50, in a case in which an application volume of the grease G applied to the inner peripheral side surface 21a of the side lip 21 forming the inter-lip space S and an application volume of the grease G applied to both of the inner peripheral side surface 22a of the intermediate lip 22 and the inner peripheral side surface 23a of a dust lip 23, the intermediate lip 22 and the dust lip 23 forming the inter-lip space R, were respectively changed, sliding resistances caused when the side lip 21, the intermediate lip 22, and the grease lip 23 contacted the hub ring 55 were measured.

Measurement conditions, on which the sliding resistances of the hub ring 55 of the hub bearing 50 were measured, are shown below.

Operation pattern: 10 rpm×10 min.⇒1000 rpm×60 min./cycle

Number of cycles: 10 cycles

Atmospheric temperature: 30° C.

Setting of inner pressure for bearing: 22 kPa sealed

Hub bearing in actual apparatus used: axis processing marks on a hub ring having directional properties of lead seams Here, regarding the operation pattern, a cycle in which initially, the hub ring 55 was rotated at 10 rpm only for 10 minutes and thereafter, the hub ring 55 was rotated at 1000 rpm for 60 minutes is defined as one cycle. The number of cycles is the number of times at which the above-described operation pattern is continuously performed. The atmospheric temperature is an ambient temperature in an atmosphere where the hub bearing 50 is placed. The inner pressure of the bearing is a sealing pressure upon sealing the grease inside the through hole 57 of the hub bearing 50. The axis processing marks on the hub ring having the directional properties of the lead seams means that the lead seams caused by processing remain on a surface of the hub ring 55.

As shown in FIG. 8, in Example 1, sliding resistances with the hub ring 55 caused when only a total of 0.05 g of an application volume of 0.02 g of the grease G applied to the inner peripheral side surface 21a of the side lip 21 forming the inter-lip space S and an application volume of 0.03 g of the grease G applied to the inner peripheral side surface 22a of the intermediate lip 22 and the inner peripheral side surface 23a of the dust lip 23, the intermediate lip 22 and the dust lip 23 forming the inter-lip space R, was applied were measured. In this case, a volume ratio of the application volume of 0.02 g of the grease G to the spatial volume V1 of the inter-lip space S formed by the side lip 21 was 2% and a volume ratio of the application volume of 0.03 g of the grease G to the spatial volume V2 of the inter-lip space R formed by the intermediate lip 22 and the dust lip 23 was 6%.

In addition, as shown in FIG. 8, in Example 2, sliding resistances with the hub ring 55 caused when only a total of 0.28 g of an application volume of 0.15 g of the grease G applied to the inner peripheral side surface 21a of the side lip 21 forming the inter-lip space S and an application volume of 0.13 g of the grease G applied to the inner peripheral side surface 22a of the intermediate lip 22 and the inner peripheral side surface 23a of the dust lip 23, the intermediate lip 22 and the dust lip 23 forming the inter-lip space R, was applied were measured. In this case, a volume ratio of the application volume of 0.15 g of the grease G to the spatial volume V1 of the inter-lip space S formed by the side lip 21 was 16% and a volume ratio of the application volume of 0.13 g of the grease G to the spatial volume V2 of the inter-lip space R formed by the intermediate lip 22 and the dust lip 23 was 25%.

Further as shown in FIG. 8, in Example 3, sliding resistances with the hub ring 55 caused when only a total of 0.33 g of an application volume of 0.2 g of the grease G applied to the inner peripheral side surface 21a of the side lip 21 forming the inter-lip space S and an application volume of 0.13 g of the grease G applied to the inner peripheral side surface 22a of the intermediate lip 22 and the inner peripheral side surface 23a of the dust lip 23, the intermediate lip 22 and the dust lip 23 forming the inter-lip space R, was applied were measured. In this case, a volume ratio of the application volume of 0.2 g of the grease G to the spatial volume V1 of the inter-lip space S formed by the side lip 21 was 21% and a volume ratio of the application volume of 0.13 g of the grease G to the spatial volume V2 of the inter-lip space R formed by the intermediate lip 22 and the dust lip 23 was 25%.

Further, as shown in FIG. 8, in Example 4, sliding resistances with the hub ring 55 caused when only a total of 0.37 g of an application volume of 0.2 g of the grease G applied to the inner peripheral side surface 21a of the side lip 21 forming the inter-lip space S and an application volume of 0.17 g of the grease G applied to the inner peripheral side surface 22a of the intermediate lip 22 and the inner peripheral side surface 23a of the dust lip 23, the intermediate lip 22 and the dust lip 23 forming the inter-lip space R, was applied were measured. In this case, a volume ratio of the application volume of 0.2 g of the grease G to the spatial volume V1 of the inter-lip space S formed by the side lip 21 was 21% and a volume ratio of the application volume of 0.17 g of the grease G to the spatial volume V2 of the inter-lip space R formed by the intermediate lip 22 and the dust lip 23 was 33%.

On the other hand, as shown in FIG. 9, in Comparative Example 1, sliding resistances with the hub ring 55 caused when a total of 0.41 g of an application volume of 0.22 g of the grease G applied to the inner peripheral side surface 21a of the side lip 21 forming the inter-lip space S and an application volume of 0.19 g of the grease G applied to the inner peripheral side surface 22a of the intermediate lip 22 and the inner peripheral side surface 23a of the dust lip 23, the intermediate lip 22 and the dust lip 23 forming the inter-lip space R, was applied were measured. In this case, a volume ratio of the application volume of 0.22 g of the grease G to the spatial volume V1 of the inter-lip space S formed by the side lip 21 was 23% and a volume ratio of the application volume of 0.19 g of the grease G to the spatial volume V2 of the inter-lip space R formed by the intermediate lip 22 and the dust lip 23 was 37%.

In addition, as shown in FIG. 9, in Comparative Example 2, sliding resistances with the hub ring 55 caused when a total of 0.72 g of an application volume of 0.4 g of the grease G applied to the inner peripheral side surface 21a of the side lip 21 forming the inter-lip space S and an application volume of 0.32 g of the grease G applied to the inner peripheral side surface 22a of the intermediate lip 22 and the inner peripheral side surface 23a of the dust lip 23, the intermediate lip 22 and the dust lip 23 forming the inter-lip space R, was applied were measured. In this case, a volume ratio of the application volume of 0.4 g of the grease G to the spatial volume V1 of the inter-lip space S formed by the side lip 21 was 42% and a volume ratio of the application volume of 0.32 g of the grease G to the spatial volume V2 of the inter-lip space R formed by the intermediate lip 22 and the dust lip 23 was 63%.

Figure 10:
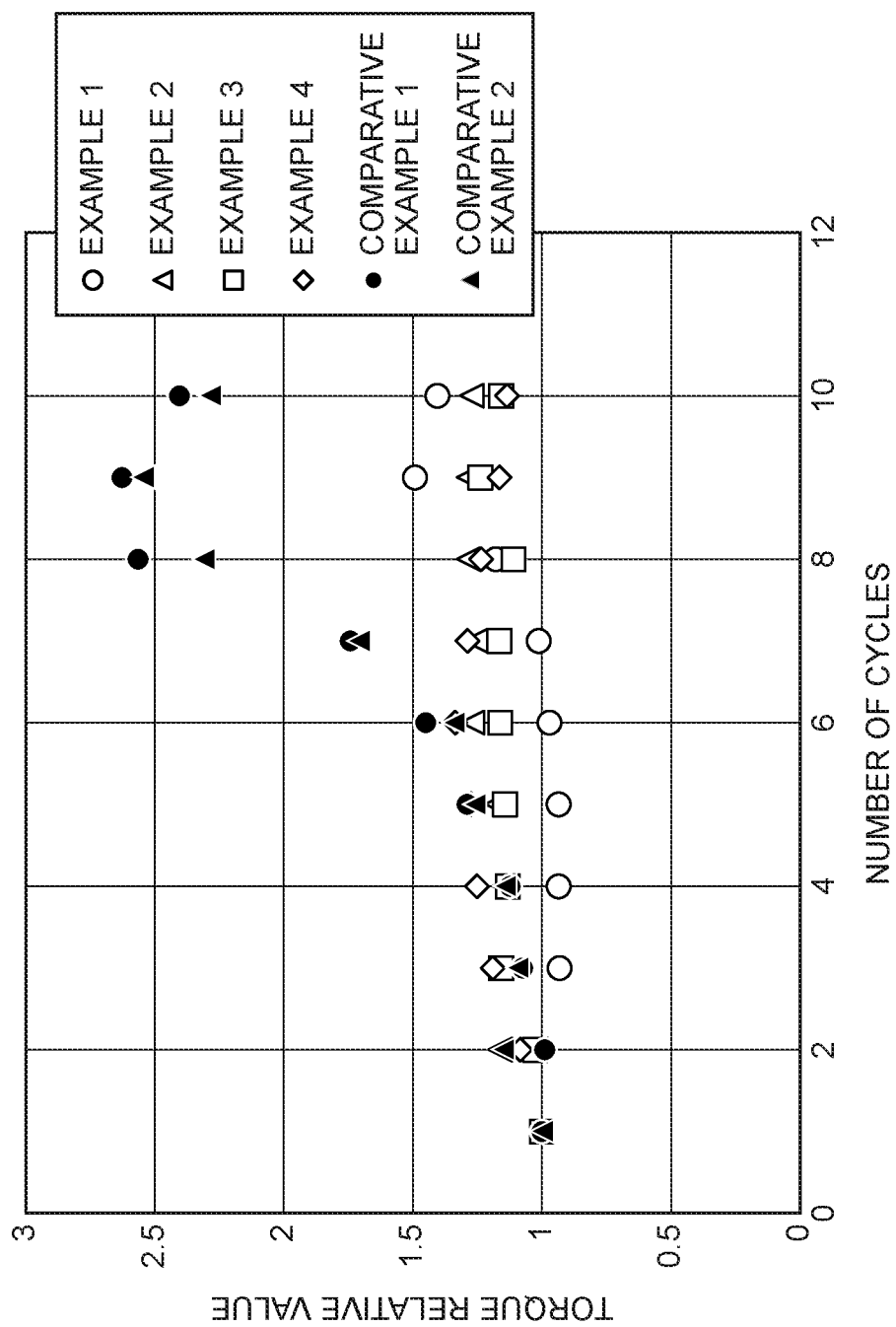
[FIG. 10] A graph showing relationship of the application volumes of the grease and torque relative values in each cycle.
Figure 11:
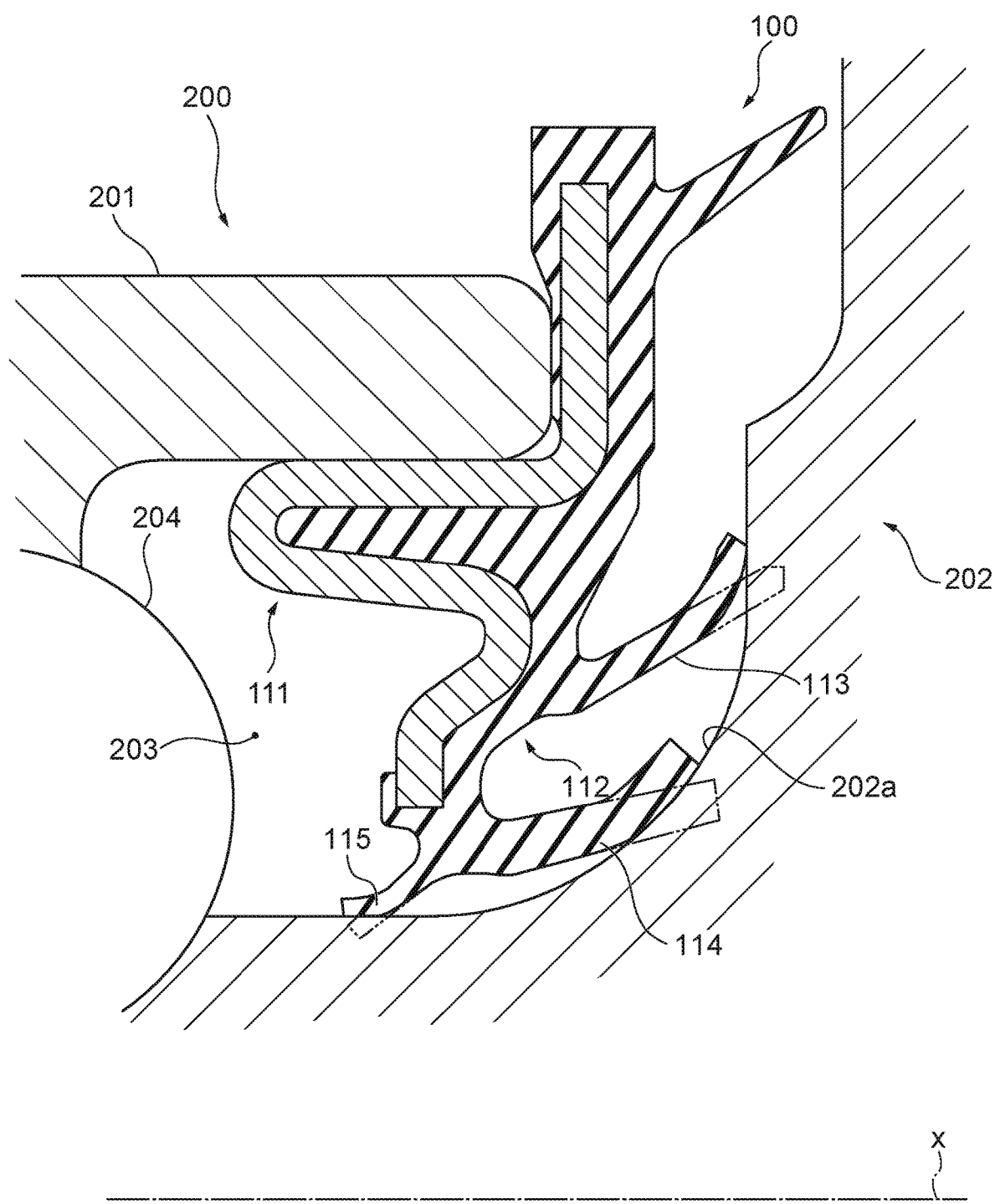
[FIG. 11] A partial cross-sectional view for showing a schematic configuration of a sealing apparatus attached to the conventional hub bearing.

As a result, as shown in FIG. 10, it was found out that in Examples 1 to 4, torque relative values of the sliding resistances of the side lip 21, the intermediate lip 22, and the grease lip 23 with the hub ring 55 did not rise and did not fluctuate in a period from the first cycle to the tenth cycle, and the torque relative values were stable in a range of 1 to 1.5. On the other hand, it was found out that in Comparative Examples 1 and 2, rises in torque relative values were observed, and the torque relative values fluctuated in a wide range of approximately 1 to 2.7. Here, the torque relative value is a relative value of a sliding resistance actual measured value in each of the second to the tenth cycle on the basis of an average value of sliding resistance actual measured values measured in the first cycle at 1000 rpm.

Accordingly, it is seen that based on Examples 1 to 4 and Comparative Examples 1 and 2, it is desirable that as the application volume of the grease G applied to the inner peripheral side surface 21a of the side lip 21 forming the inter-lip space S, it is only required for the volume ratio thereof to the spatial volume V1 of the inter-lip space S to be equal to or less than 21%. In addition, it is seen that based on Examples 1 to 4 and Comparative Examples 1 and 2, as the application volume of the grease G applied to the inner peripheral side surface 22a of the intermediate lip 22 and the inner peripheral side surface 23a of the dust lip 23, the intermediate lip 22 and the dust lip 23 forming the inter-lip space R, it is only required for the volume ratio thereof to the spatial volume V2 of the inter-lip space R to be equal to or less than 33%.

OTHER EMBODIMENTS

Hereinbefore, a preferred embodiment of the present disclosure is described. However, the present disclosure is not limited to the sealing apparatus 1 according to the above-described embodiment, and all modes included in the concept of the present disclosure and the scope of the appended claims are embraced. In addition, the respective components may be appropriately and selectively combined so as to exhibit at least one part of the above-described solutions and effects. For example, the shapes, materials, arrangements, sizes, and the like of the components in the above-described embodiment may be appropriately changed depending on a specific use mode of the present disclosure. Note that regarding the features for inhibiting the sliding resistance from increasing attained by the sealing apparatus 1 according to the present embodiment, any various combinations are possible.

In addition, the sealing apparatus 1 according to the present embodiment is applied to the hub bearing 50. However, an application target of the sealing apparatus according to the present disclosure is not limited thereto, and the present disclosure is applicable to all configurations of other vehicles, general-purpose machines, industrial machines, and the like, for which the effects exhibited by the present disclosure can be employed.

What is claimed is:

1. A sealing structure comprising:
an outer periphery side member;
a hub at least partially enclosed by the outer periphery side member, the outer periphery side member and the hub being mutually relatively rotatable about an axis, wherein the hub comprises a plurality of seams formed thereon; and
a sealing apparatus sealing a space between the outer periphery side member and the hub, wherein the sealing apparatus includes:
an annular reinforcement ring disposed around the axis; and
an annular elastic body part attached to the reinforcement ring and disposed around the axis, the annular elastic body part being formed of an elastic body,
the elastic body part has:
a side lip extending toward one side with respect to the axis and being formed so as to contact the hub from an other side with respect to the axis;
an intermediate lip extending toward the one side on an inner periphery side of the side lip and being formed so as to contact the hub from the other side; and a grease lip extending toward the other side on an other side of the intermediate lip and being formed so as to contact the hub from an outer periphery side, and wherein a first space enclosed by the side lip, the intermediate lip of the elastic body part, and the hub comprises a volume of grease that is greater than 2% and equal to or less than 21% of a volume of the first space, and wherein a second space enclosed by the intermediate lip, the grease lip of the elastic body part, and the hub comprises a volume of grease that is greater than 6% and equal to or less than 33% of a volume of the second space.

2. The sealing structure according to claim 1, wherein the side lip, the intermediate lip, and the hub define an inter-lip space, wherein a cross-sectional area of the inter-lip space is equal to or greater than 3.5 mm$^2$.

3. The sealing apparatus according to claim 1, wherein the grease is intended to be applied to an inner peripheral side surface of each of the side lip, the intermediate lip, and the grease lip, and a thickener of the grease is not a urea-based thickener.

4. The sealing apparatus according to claim 1, wherein on a surface of each of the side lip, the intermediate lip, and the grease lip on the inner periphery side, a pearskin part is formed.

5. The sealing apparatus according to claim 4, wherein a surface roughness of the pearskin part is equal to or greater than 7 μmRz as determined by JIS B0601:1994.

* * * * *

UNITED STATES PATENT AND TRADEMARK OFFICE
CERTIFICATE OF CORRECTION

| | |
|---|---|
| PATENT NO. | : 11,578,757 B2 |
| APPLICATION NO. | : 16/417881 |
| DATED | : February 14, 2023 |
| INVENTOR(S) | : Yuichi Tarukawa et al. |

It is certified that error appears in the above-identified patent and that said Letters Patent is hereby corrected as shown below:

On the Title Page

Item (73) Assignee: "MINEBEA MITSUMI Inc., Nagano, (JP)" should read -- NOK CORPORATION, Tokyo, (JP) --

Signed and Sealed this
Eleventh Day of April, 2023

Katherine Kelly Vidal
*Director of the United States Patent and Trademark Office*